United States Patent
Sjödin et al.

(10) Patent No.: US 12,084,038 B2
(45) Date of Patent: Sep. 10, 2024

(54) METHOD AND CONTROL DEVICE FOR OPERATING A MODULAR VEHICLE

(71) Applicant: Scania CV AB, Södertälje (SE)

(72) Inventors: Robert Sjödin, Nyköping (SE); Pontus Svens, Rönninge (SE); Verena Löfqvist Klass, Huddinge (SE); Linus Ährlig, Västerhaninge (SE); André Claesson, Tullinge (SE)

(73) Assignee: Scania CV AB, Södertälje (SE)

( * ) Notice: Subject to any disclaimer, the term of this patent is extended or adjusted under 35 U.S.C. 154(b) by 571 days.

(21) Appl. No.: 17/289,304

(22) PCT Filed: Oct. 31, 2019

(86) PCT No.: PCT/SE2019/051096
§ 371 (c)(1),
(2) Date: Apr. 28, 2021

(87) PCT Pub. No.: WO2020/096507
PCT Pub. Date: May 14, 2020

(65) Prior Publication Data
US 2022/0009471 A1      Jan. 13, 2022

(30) Foreign Application Priority Data

Nov. 5, 2018   (SE) .................................... 1851370-5

(51) Int. Cl.
*B60W 10/08*         (2006.01)
*B60K 7/00*          (2006.01)
(Continued)

(52) U.S. Cl.
CPC ............. *B60W 10/08* (2013.01); *B60L 15/20* (2013.01); *B60K 7/0007* (2013.01);
(Continued)

(58) Field of Classification Search
None
See application file for complete search history.

(56) References Cited

U.S. PATENT DOCUMENTS

| | | |
|---|---|---|
| 8,620,488 B2 | 12/2013 | Johansson et al. |
| 9,193,351 B2 | 11/2015 | Zhao et al. |
| (Continued) | | |

FOREIGN PATENT DOCUMENTS

| | | |
|---|---|---|
| CN | 102390249 A | 3/2012 |
| CN | 102803040 A | 11/2012 |
| (Continued) | | |

OTHER PUBLICATIONS

Scania CV AB, International Patent Application No. PCT/SE2019/051096, International Search Report, Jan. 17, 2020.
(Continued)

*Primary Examiner* — Aniss Chad
*Assistant Examiner* — Madison R. Inserra
(74) *Attorney, Agent, or Firm* — Moore & Van Allen PLLC; W. Kevin Ransom (57) ABSTRACT

A method for operating a vehicle comprising at least one functional module, two or more drive modules, which are: autonomously operated, individually associated with a set of energy parameters, a pair of wheels, an electrical motor operating the wheels, and an interface releasably connected to an interface on the functional module, and wherein one drive module has a gear ratio different from any gear ratio of any other drive module. The method comprises: obtaining route information describing a planned route of the vehicle; determining a distribution of a requested driving torque between the respective at least one electrical motors of the two or more drive modules for operating the vehicle along the route based on the route information and the individual sets of energy parameters in order to meet energy criteria;

(Continued)

and controlling the two or more drive modules to produce the requested driving torque, in accordance with the determined distribution.

25 Claims, 3 Drawing Sheets

(51) Int. Cl.

| | | |
|---|---|---|
| *B60K 17/356* | (2006.01) | |
| *B60L 15/20* | (2006.01) | |
| *B60K 1/00* | (2006.01) | |
| *B60K 17/354* | (2006.01) | |
| *B60P 3/42* | (2006.01) | |
| *B60P 7/13* | (2006.01) | |
| *B60W 30/18* | (2012.01) | |
| *B60W 50/00* | (2006.01) | |
| *B62D 63/02* | (2006.01) | |

(52) U.S. Cl.
CPC ......... *B60K 17/356* (2013.01); *B60L 2240/62* (2013.01); *B60W 2556/50* (2020.02); *B60W 2710/083* (2013.01)

(56) References Cited

U.S. PATENT DOCUMENTS

| | | | |
|---|---|---|---|
| 9,566,978 B2 | 2/2017 | Yang et al. | |
| 9,669,820 B1 | 6/2017 | Conlon et al. | |
| 2009/0088914 A1 | 4/2009 | Mizutani et al. | |
| 2011/0203863 A1 | 8/2011 | Yeh | |
| 2011/0245007 A1* | 10/2011 | Yoshimura | B60K 6/52 |
| | | | 903/910 |
| 2013/0324340 A1* | 12/2013 | Holmes | B60K 6/445 |
| | | | 475/5 |
| 2014/0262583 A1* | 9/2014 | Url | B62D 33/023 |
| | | | 296/183.1 |
| 2016/0129958 A1 | 5/2016 | Byrnes et al. | |
| 2018/0009314 A1* | 1/2018 | Mehlis | F16H 37/084 |
| 2018/0134334 A1 | 5/2018 | Kentley-Klay | |
| 2018/0345777 A1* | 12/2018 | Birnschein | B60S 9/02 |

FOREIGN PATENT DOCUMENTS

| | | | |
|---|---|---|---|
| CN | 104276031 A | 1/2015 | |
| CN | 107284223 A | 10/2017 | |
| DE | 10154353 A1 | 5/2002 | |
| DE | 102011078270 A1 | 1/2013 | |
| DE | 102013004837 A1 | 9/2014 | |
| DE | 102016014882 A1 | 6/2017 | |
| DE | 102016209099 A1 | 7/2017 | |
| DE | 102016011411 A1 * | 3/2018 | |
| DE | 102018002229 A1 | 8/2018 | |
| DE | 102017216207 A1 | 10/2018 | |
| EP | 559342 A2 | 9/1993 | |
| EP | 2014531 A2 | 1/2009 | |
| EP | 2997805 A1 * | 3/2016 | ............ A01B 67/00 |
| JP | H06189415 A | 7/1994 | |
| JP | 10119807 A | 5/1998 | |
| JP | 11149316 A | 6/1999 | |
| WO | 2009017533 A1 | 2/2009 | |
| WO | 2017152084 A1 | 9/2017 | |
| WO | WO-2019091187 A1 * | 5/2019 | ............ B60L 15/20 |

OTHER PUBLICATIONS

Scania CV AB, International Patent Application No. PCT/SE2019/051096, Written Opinion, Jan. 17, 2020.
Scania CV AB, Swedish Patent Application No. 1851370-5, Office Action, May 3, 2019.
Scania CV AB, Brazilian Patent Application No. BR112021007316-7, Preliminary Office Action, Jun. 27, 2023.
Scania CV AB, European Patent Application No. 19881457.6, Extended European Search Report, Jun. 30, 2022.
Scania CV AB, Chinese Patent Application No. 201980070145.X, First Office Action, May 26, 2022.
Scania CV AB, International Patent Application No. PCT/SE2019/051096, International Preliminary Report on Patentability, May 11, 2021.

\* cited by examiner

METHOD AND CONTROL DEVICE FOR OPERATING A MODULAR VEHICLE

CROSS-REFERENCE TO RELATED APPLICATIONS

This application is a National Stage Patent Application (filed under 35 § U.S.C. 371) of PCT/SE2019/051096, filed Oct. 31, 2019 of the same title, which, in turn claims priority to Swedish Patent Application No. 1851370-5 filed Nov. 5, 2018 of the same title; the contents of each of which are hereby incorporated by reference.

TECHNICAL FIELD

The present disclosure relates to techniques in the context of vehicles, and to a method for operating a modular vehicle comprising at least one functional module and at least two drive modules. The disclosure also relates to a corresponding control device, to a vehicle comprising the control device, to a computer program and a computer-readable medium.

BACKGROUND

Vehicles of today are typically manufactured for a specific purpose, e.g. a bus is manufactured for transporting people and a truck is manufactured for transporting goods. Such vehicles are commonly manufactured and completely assembled in a factory, or they may be partly assembled in a factory and completed at a body manufacturer. Once the vehicle is assembled, the vehicle may be used for the specific purpose. Thus, a bus may be used as a bus and a garbage truck may be used as a garbage truck. Different vehicles are thus needed for different purposes, which may require a large fleet of vehicles for a hauler, and thereby become very costly.

The most common engines in a vehicle of today are internal combustion engines, such as diesel engines. Diesel engines require gear boxes with a plurality of gears, often six to twelve gears, because of the properties of the motor. The gear box is a basically a torque and speed converter which adapts the traction of the internal combustion motor to match the traction requirement of the vehicle. Without a gear box, the vehicle would not be able to pull away, and would have very poor acceleration performance. The gear box is heavy and contains a plurality of parts that require service and repair.

Considering environmental impact, electrical motors is an attractive alternative to internal combustion engines. Also, vehicles equipped with electrical motors typically do not require a gearbox to operate the vehicle. This because the traction output from the electrical motors immediately matches the traction requirement (if the force applied to the wheels is not too large), as the electrical motors instantly can produce a great amount of torque. Document US-2016/0129958 A1 discloses a modular electric vehicle using interchangeable vehicle assembly modules. Here, benefits of modularity and electrical traction are combined. However, new solutions will be demanded to provide even more energy-efficient utilization of the modular electric vehicles.

SUMMARY

It is an object of the disclosure to provide energy-efficient utilization of a modular electric vehicle during travelling. It is a further object to provide energy-efficient utilization of a modular electric vehicle during travelling, where the vehicle comprising at least two individual drive modules.

This object and others are at least partly achieved by a method, a control device and a vehicle according to the independent claims, and by the embodiments according to the dependent claims.

According to a first aspect, the disclosure relates to a method performed by a control device of a vehicle, for operating the vehicle. The vehicle comprises at least one functional module and two or more drive modules. The drive modules are configured to be autonomously operated. The drive modules are also individually associated with an individual set of energy parameters. At least one drive module has a gear ratio being different from any other gear ratio of any other drive module. Each of the drive modules comprises a pair of wheels, at least one electrical motor arranged for operating the pair of wheels, and at least one interface releasably connected to a corresponding interface on the functional module. The method comprises obtaining route information describing a planned route of the vehicle and determining a distribution of a requested driving torque between the respective at least one electrical motors of the two or more drive modules for operating the vehicle along the route based on the route information and the individual sets of energy parameters in order to meet energy criteria. The method also comprises controlling the two or more drive modules to produce the requested driving torque, in accordance with the determined distribution. The method provides energy-efficient utilization of a modular electric vehicle during travelling, using the modularity of the vehicle. As the drive modules are independent drive modules, their characteristics (i.e. their sets of energy parameters) can be evaluated such that the most suitable drive module is mainly used to propel the vehicle, considering route information. The method may be used to determine the distribution along planned route before the vehicle has started to drive along the planned route, or the method may be used to determine the distribution continually or continuously while driving along the planned route.

According to some embodiments, the individual sets of energy parameters for the individual drive modules indicate respective individual gear ratios of the drive modules. Thus, a set of energy parameters for a drive module is indicative of the gear ratio of that drive module. Thereby, the suitability of the drive modules in terms of gear ratio can be evaluated based on their respective sets of energy parameters.

According to some embodiments, the individual gear ratios are individually associated with a certain speed or speed interval of the respective associated drive module. Thereby, the suitability of the drive modules in terms of speed can be directly evaluated.

According to some embodiments, the route information comprises speeds associated with route segments of the route. The determining comprises determining a distribution of a requested driving torque between the respective at least one electrical motors of the two or more drive modules for operating the vehicle along the route, based on the route information and the individual sets of energy parameters in order to meet energy criteria including to maintain the speeds associated with route segments of the route. The vehicle is often required to achieve or keep a certain speed. In case there is no driver in the vehicle, i.e. it is autonomously operated, there is no driver present to set the desired speed of the vehicle. The desired speed may then be detected by the vehicle itself as route information or be determined by an off-board system and communicated to the vehicle as route information. The planned route may be divided into one or several route segments. The vehicle will then know what speeds that are associated with different route segments, and the method determines distribution and distributes torque request to the most suitable drive module(s) to achieve the speeds.

According to some embodiments, the method comprises matching the speeds associated with route segments of the route, with the respective individual speed or speed interval associated with the individual gear ratios, in order to achieve the energy criteria to meet the speeds associated with the road segments. The determining comprises determining a distribution of a requested driving torque where the requested driving torque is distributed to the at least one electrical motor of the drive module that best matches the speed associated with a route segment, e.g. on which the vehicle is currently being driven. The controlling comprises controlling the two or more drive modules to produce the requested driving torque, in accordance with the determined distribution, during said route segment. Thus, the driving torque may mainly or totally be requested from the at least one electrical motor of the drive module that is associated with the speed or speed interval that matches the speed associated with a route segment during travelling along that route segment. Thereby, an efficient operation of the vehicle may be achieved.

According to some embodiments, one of the drive modules of the two or more drive modules is configured with gear ratio configured for startability. Thus, the gear ratio has a high efficiency for reliable startability. For example, the gear ratio configured for reliable startability may be 1:8-1:10.

According to some embodiments, one of the drive modules of the two or more drive modules is configured with gear ratio configured for extra-urban conditions. Thus, the gear ratio has a high efficiency for extra-urban conditions. For example, the gear ratio configured for extra-urban conditions may be 1:0.8-1:2.

According to some embodiments, one of the drive modules of the two or more drive modules is configured with gear ratio configured for urban conditions. Thus, the gear ratio has a high efficiency for urban conditions. For example, the gear ratio configured for urban conditions may be 1:6-1:8.

According to some embodiments, the route information comprises topology information associated with route segments of the route, and at least one of the drive modules has individual gear ratio configured for the topology of at least one of the segments. Thus, the gear ratio has a high efficiency for a certain topology. Thus, the gear ratio may be configured for steep hills, e.g. have a gear ratio of 1:3 or 1:4. In another example, the gear ratio is configured for flat road segments, thus cruising at the same speed, for example a gear ratio of 1:1 or 1:2.

According to some embodiments, the two or more drive modules have gear ratios that are individually configured for the topology of mutually different types of segments. Thus, one drive module may have a gear ratio configured for steep hills, and one drive module may have a gear ratio configured for cruising.

According to some embodiments, the method comprises obtaining information of a load of the at least one functional module of the vehicle. The determining then comprises determining a distribution of a requested driving torque between the respective at least one electrical motors of the two or more drive modules for operating the vehicle along the route, based on the route information, the individual sets of energy parameters and the load of the individual sets of energy parameters and the load of the vehicle, in order to meet energy criteria. Thus, the method may also take also information of the load into account, such as the weight of the load. The weight of the load may affect startability of the vehicle and the capability to travel in steep slopes.

According to some embodiments, the individual set of energy parameters for respective individual drive module comprises a parameter indicating an amount of energy available to the drive module. For example, the parameter may be the state of charge (SOC) level of the energy available to the drive module. The method may thus take the SOC level into account, such that the drive modules can deliver the requested driving torque.

According to a second aspect, the disclosure relates to a control device for operating an autonomous vehicle. The autonomous vehicle comprises at least one functional module and two or more drive modules. The drive modules are configured to be autonomously operated and are individually associated with an individual set of energy parameters. At least one drive module has a gear ratio being different from any other gear ratio of any other drive module. The drive modules respectively comprise a pair of wheels, at least one electrical motor arranged for operating the pair of wheels, and at least one interface releasably connected to a corresponding interface on the functional module. The control device is configured to obtain route information describing a planned route of the vehicle, and to determine a distribution of a requested driving torque between the respective at least one electrical motors of the two or more drive modules for operating the vehicle along the route, based on the route information and the individual sets of energy parameters in order to meet energy criteria. The control device is also configured to control the two or more drive modules to produce the requested driving torque, in accordance with the determined distribution. The same positive effect as of the method may be achieved.

According to a third aspect, the disclosure relates to a vehicle comprising a control device according to the second aspect. The vehicle comprises at least one functional module and two or more drive modules. The drive modules are configured to be autonomously operated and are individually associated with an individual set of energy parameters. At least one drive module has a gear ratio being different from any other gear ratio of any other drive module. The drive modules respectively comprises a pair of wheels, at least one electrical motor arranged for operating the pair of wheels, at least one interface releasably connected to a corresponding interface on the functional module.

According to a fourth aspect, the disclosure relates to a computer program comprising instructions which, when the program is executed by a computer, cause the computer to carry out the method according to the first aspect.

According to a fifth aspect, the disclosure relates to a computer-readable medium comprising instructions which, when executed by a computer, cause the computer to carry out the method according to the first aspect.

DETAILED DESCRIPTION

One way of meeting customers' different vehicle needs in a flexible and cost-efficient way is to use a modularized vehicle assembled from a set of modules. Such a modularized vehicle, herein referred to as a modular vehicle, is typically assembled at the customer's premises and the customer may thus buy a set of modules from a manufacturer. The modular vehicle can easily be assembled and re-assembled e.g. to perform a certain mission.

A modular vehicle is e.g. assembled by at least one functional module for performing a certain function (such as carrying a load), and two or more drive modules used for driving the vehicle. The drive modules are configured to be autonomously and/or remotely operated. The load may for example be humans, animals or goods. A modular vehicle may be used to perform many different kinds of assignments, and thus transport different kinds of loads at different occasions.

A method is herein proposed, for operating the modular vehicle in an efficient way. The vehicle is electrically propelled, and for that purpose, each drive module comprises at least one propulsion system including one or several electrical motors. The at least one propulsion system of a drive module has a gear ratio being different from any other gear ratio of the other propulsion systems of the two or more drive modules. Thus, one drive module may have a gear ratio for driving with a low speed, i.e. for urban conditions. Another of the two or more drive modules may have a gear ratio for driving with a high speed, i.e. for extra-urban conditions. Such properties may be reflected in an individual set of energy parameters associated with each drive module.

In order to operate the vehicle, a driving torque is requested from the drive modules to overcome the total forces acting on the vehicle (such as rolling resistance force to the wheels, gradient resistance force and aerodynamic drag resistance force) to achieve e.g. a certain speed. By determining a distribution of the requested driving torque between the drive modules, based on route information and the individual sets of energy parameters, a distribution of the requested driving torque is determined. The distribution is determined to meet energy criteria such as using the available battery power efficiently, gradeability, cruising efficiently etc. One of the drive modules, appointed as master drive module, will thus determine how the requested torque should be distributed between the drive modules, to meet one or several energy criteria most efficiently. For example, if the route information is indicative of urban conditions, most or all driving torque is requested from the drive module configured for urban conditions. Also, if the route information is indicative of extra-urban conditions, most or all driving torque may be requested from the drive module configured for extra-urban conditions.

With the proposed method, a kind of electrical transmission is achieved, without disadvantages of a mechanical gear box, such as heavy weight, need of service and repair. As there is no gear box or clutch system, the vehicle becomes more silent. Hence, the modular vehicle is operated in an energy efficient way, whereby power consumption may be reduced, and the propulsion systems may be exposed to less wear. This without abstaining reliable startability etc.

For better understanding of the proposed technique, the concept of assembling a vehicle from modules will now be explained with reference to the example embodiment of FIG. 1.

Figure 1:
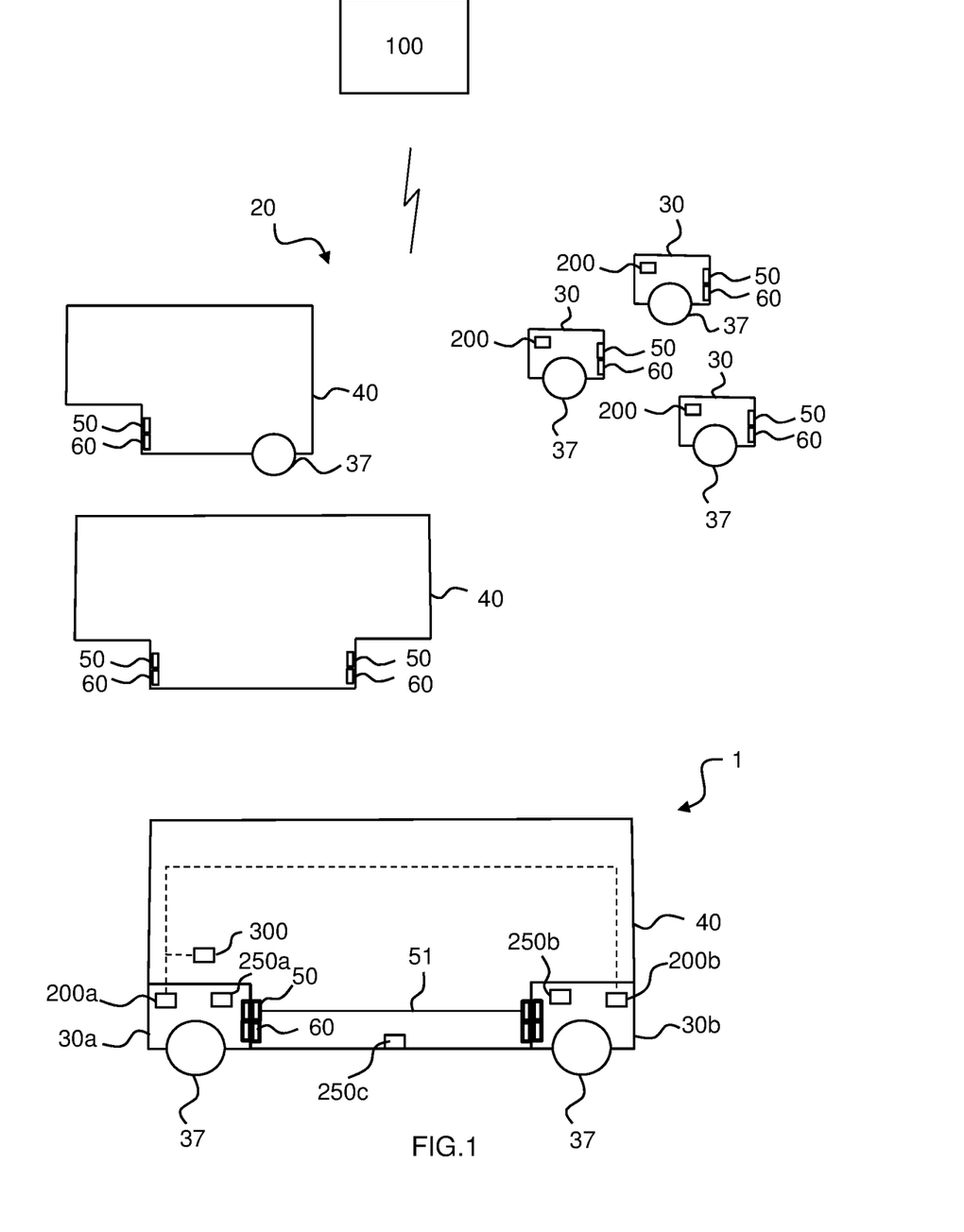
FIG. 1 illustrates a set of modules, a vehicle assembled from the set of modules, and an offboard system.

FIG. 1 illustrates an example set of modules 20 for assembling a vehicle 1. An offboard system, herein referred to as a first control device 100, and an example of an assembled vehicle 1 are also illustrated. The set of modules 20 comprises a plurality of drive modules 30 and a plurality of functional modules 40.

The drive modules' 30 main function is typically to drive (e.g. propel, steer and brake) a vehicle 1. The drive modules 30 comprise a pair of wheels 37 and are configured to be autonomously operated. The functional modules are configured to perform a certain function such as to carry a load, e.g. goods or people. Each module 30, 40 in the set of modules 20 comprises at least one interface 50 releasably connectable to a corresponding interface 50 of another module 30, 40. The drive modules 30 may be remotely controlled from a control device 100 in an off-board system.

By combining drive modules 30 and functional modules 40 different types of vehicles 1 can be achieved. Some vehicles 1 require two or more drive modules 30 and some vehicles 1 only require one drive module 30, depending on the structural configuration of the functional module 40. Each drive module 30 comprises a control device, herein referred to as a second control device 200, and may thus communicate with a control center or off-board system, i.e. the first control device 100. Since the drive modules 30 may be configured to be operated as independently driven units by means of the second control devices 200, the drive modules 30 may be connected to, or disconnected from, the functional module(s) 40 without manual work.

The principle of assembling a vehicle 1 from modules 30, 40 will now be described. An operator may receive a mission from a client to transport goods from one location to another. The operator enters the information about the mission into the first control device 100 via a user interface, such as a touch screen or similar. It is pointed out that this is merely an example, and the received mission may automatically be translated and/or inputted to the first control device 100. The first control device 100 then determines which function to be performed and thus which type of vehicle 1 is required to complete the mission. In this example, the required vehicle 1 may be a truck. The first control device 100 selects which modules 30, 40 to use for the required truck. The type of vehicle 1 and the modules 30, 40 required to complete the mission may for example be selected based on information about the goods, the distance to travel and/or the geographical location. The first control device 100 then suitably converts the mission into a command for one or two selected drive modules 30 to physically and electrically connect with the selected functional module 40. The second control devices 200 of the drive modules 30 each receives the command and converts the command to control signals for the respective drive module 30. The drive modules 30 are thereby controlled to physically and electrically connect with the functional module 40. Controlling the drive module 30 to connect with a functional module 40 may comprise controlling the drive module 30 to identify the position of the selected functional module 40 and move to that position. The position of the selected functional module 40 may be determined based on information received in the command to connect the drive module 30 with the functional module 40. Alternatively, the command to connect the drive module 30 and the functional module 40 is transmitted to both the drive module 30 and the functional module 40, whereby the functional module 40 prepares for the connection and starts transmitting a signal. The drive module 30 may then determine the position of the functional module based on this transmitted signal. The drive modules 30 are thus autonomously operated to find the selected functional module 40 and connect with that functional module 40. At least one sensor device 60 arranged at the drive modules 30 and/or the functional module 40 may be configured to sense when the physical and/or electrical connection has been performed. The at least one sensor device 60 may send a signal to the second control device 200 indicating that the connection(s) have been performed. Based on the signal from the at least one sensor device 60, the second control device 200 may send a verification signal to the first control device 100 for verification of the connection(s). The first control device 100 may then generate a unique vehicle identity for the assembled vehicle 1. A vehicle 1 is thus assembled and the vehicle 1 is ready to perform the mission. The mission may also comprise more detailed information of the driving mission, for example details of a planned route of the vehicle 1 including a destination and a starting point or position, waypoints, information about the goods, a distance to travel and/or one or several geographical locations etc.

The assembled vehicle 1 in FIG. 1 comprises a first drive module 30a, a functional module 40 and a second drive module 30b. However, it should be understood that the assembled vehicle 1 may comprise more than two drive modules 30. Also, the assembled vehicle 1 may comprise more than one functional module 40. In any case, the at least one functional module 40 is arranged for carrying a load, and the at least one functional module 40 is releasably connected with the first drive module 30a that is configured to be autonomously operated. The load of the vehicle 1 is a load in the at least one functional module 40, which thus constitute the load of the vehicle 1. If the vehicle 1 comprises several functional modules 40, the load of the vehicle 1 comprises all the individual loads in the functional modules 40. The functional module 40 may include a suspension system (not shown). The suspension system may be configured, e.g. by a control device 300 in the functional module 40, to have different suspension actions.

The control devices 200 in the first drive module 30a and the second drive module 30b are in the assembled vehicle 1 in FIG. 1 denoted 200a and 200b, respectively.

In some embodiments, each module 30a, 30b, 40 of the vehicle 1 comprises an individual sensor arrangement 250a, 250b, 250c. Alternatively, in some embodiments, only each drive module 30a, 30b comprises an individual sensor arrangement 250a, 250b. In still another embodiment, only the functional module 40 comprises an individual sensor arrangement 250c. A sensor arrangement 250a, 250b, 250c may comprise one or several sensors. The one or several sensors may include sensors for monitoring the environment, and/or monitoring vehicle driving behaviour or other vehicle properties. For example, the one or several sensors may include at least one camera, at least one lidar, at least one ultrasonic sensor, at least one radar, at least one accelerometer, at least one gyro meter, a weight sensor, a suspension action sensor, a weight sensor and/or a positioning sensor. Sensor data from one or several sensors in such sensor arrangement 250a, 250b, 250c may be used to determine information of the route ahead, thus road properties such as altitude or road conditions.

Figure 2:
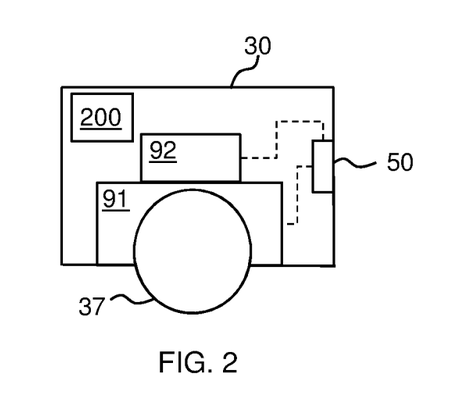
FIG. 2 schematically illustrates a drive module in further detail in a side view.

FIG. 2 schematically illustrates a drive module 30 in further detail in a side view. The drive module 30 comprises at least one (only one illustrated) propulsion system 91, an energy storage device 92, an interface 50 and a control device 200. The drive module 30 may also comprise a suspension system (not shown), that is arranged to suspend the wheels of the drive module 30. The suspension system may be configured, e.g. by the control device 200, to have different suspension action.

Figure 3:
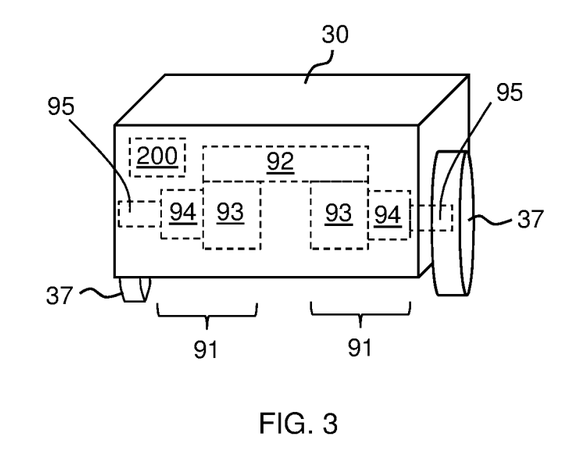
FIG. 3 schematically illustrates a drive module in further detail in a front view.

FIG. 3 schematically illustrates the drive module 30 of FIG. 2 in a further detail in a front view. In this embodiment, each wheel 37 of the pair of wheels is configured to be operated, e.g. rotated, by an individual propulsion system 91. Alternatively, the pair of wheels are operated by a common propulsion system. In some embodiments, and as illustrated in FIG. 3, the propulsion system 91 comprises an electrical machine 93, i.e. an electrical motor, and a gear device 94. Thus, in some embodiments, each wheel 37 is individually driven by its own electric machine 93. One wheel 37 is arrange to an output shaft 95 of the gear device 94, typically via a hub (not shown). The gear device 94 is arranged to an output shaft of the electrical motor. In some embodiments, the gear device 94 has a fixed gear ratio. The gear device 94 is for example a planetary gear device. Typically, an individual gear device 94 is configured to provide one or several gear ratios, for example one, two, three or four mutually different individual gear ratios. Examples of such gear ratios is e.g. 1:1, 1:2, 1:3, 1:4, 1:5, 1:6 etc. The gear ratios shall be seen from the electrical machine, thus, a gear ratio of 1:2 means that for two revolutions of the driver (electrical machine), the driven gear (e.g. output axis from the gear device) has made one revolution. Thus, in one example, a first gear device 94 of a first propulsion system 91 of the drive module 30 may have gear ratios of 1:1, 1:2 and 1:3. A second gear device 94 of a second propulsion system 91 the drive module 30 may have gear ratios of 1:4, 1:5 and 1:6. According to one embodiment, while driving, it is only one of the propulsion systems 91 of one of the drive modules 30 that is active and operates one wheel, the other wheels are only following. Of course, the gear ratios of the propulsion systems 91 of one drive module 30 may be equal.

In some embodiments, an individual gear device 94 is configured to provide one static gear ratio. Then, the gear ratio of the individual gear device 94 cannot be changed. In case the drive module 3 comprises two propulsion systems 91, as in FIG. 3, the respective gear devices 94 of the propulsion systems 91 have equal gear ratios. Equal gear ratios mean the same number of different gear ratios, and the same sizes of the respective gear ratios.

In an alternative embodiment, the drive module 30 comprises only one propulsion system 91. In such embodiment, the one propulsion system is configured to operate both wheels 37 of the pair of wheels, thus, the pair of wheels are operated by a common propulsion system. The one propulsion system comprises for example an electrical machine, i.e. an electrical motor, and a gear device. The gear device may be a pinion gear. For example, the gear device may include a pinion and a crown wheel. The gear device is arranged to the output shaft of the electrical motor, and the gear device operates on wheel shafts that are connected to the wheels 37. The gear device may e.g. include a differential.

In a vehicle 1 comprising two drive modules 30 or more, at least one drive module 30 has a gear ratio being different from any other gear ratio of any other drive module 30 of the vehicle 1. Thus, one drive module 30 may for example have one or two gear devices with gear ratio 1:1, 1:2 and 1:3. Another drive module 30 must then have one gear device with at least one different gear ratio, for example 1:4. Thereby the drive modules 30 can have different optima considering e.g. efficient speed interval.

It should here be understood that the gear ratios or the gear devices are comparable as the electrical machines are here considered to have the same power output and the same dimensions of output axis etc.

The electric machine(s) may also work as generators and generate electric energy when braking the wheels 37. Thus, the propulsion system is typically the primary braking system of the vehicle 1. However, because the braking functionality system may in some situations be insufficient or fail for some reason, a secondary braking system is required. This secondary braking system is herein referred to as the braking system. The braking system comprises for example standard disc brakes and electromechanical actuators that require reliable power supply.

The drive module 30 also comprises at least one energy storage device 92 for supplying power to the propulsion system(s) 91. The energy storage device 92 is for example an electric battery that may be recharged with electric energy.

The control device 200 is configured to operate the drive module 30 as an independently driven unit. The drive module 30 may transport itself without any externally driven unit such as a towing vehicle. The drive module 30 may transport itself by means of the at least one propulsion system 91. The drive module 30 may be configured to be autonomously operated. Thus, the control device 200 may be configured to control the operation of the drive module 30. The control device 200 may be configured to transmit control signals to the various systems and components of the drive module 30 for controlling for example the steering and the propulsion of the drive module 30. The control device 200 may be configured to operate the drive module 30 autonomously based on received commands. The control device 200 may thus be configured to receive commands from a remotely located off-board system i.e. the first control device 100, and to convert the commands into control signals for controlling the various systems and components of the drive module 30. The control device 200 may also be configured to receive data about the surroundings from at least one sensor and based on this data control the drive module 30. The control device 200 will be described in further detail in connection with FIG. 5.

The drive module 30 may be configured to be releasably connected to either a second drive module 30 and/or a functional module 40 for forming an assembled vehicle 1. The at least one interface 50 of the drive module 30 is configured to physically connect the drive module 30 with a second drive module 30 and/or a functional module 40. The interface(s) 50 of the drive module 30 may be releasably connectable to a corresponding interface 50 of a second drive module 30 and/or a functional module 40.

In FIG. 1 the drive modules 30 are illustrated with only one interface 50, on one side of the drive module 30. However, it is to be understood that each drive module 30 may comprise a plurality of interfaces 50 for releasable connection with other modules 40. The interface(s) 50 of the drive modules 30 may be arranged on different sides of the drive module 30 and thus enable connection with other modules 30, 40 on multiple sides of the drive module 30. The interfaces 50 on the drive modules 30 and the functional modules 40 respectively, are suitably arranged on corresponding positions to enable connection between the modules 30, 40.

In some embodiments, the at least two interfaces 50 comprises electric interfaces, arranged for transferring electric power and/or transmitting electric signals between the drive module 30 and another module e.g. to a functional module 40 to which the drive module is connected. The electrical interface 50 may be a wireless interface such as conductive interface. In other words, by connecting the drive module 30 and the functional module 40 electrically the modules 30, 40 may transfer power between each other and share information. The drive module 30 may, for example, control parts of the functional module 40, such as opening and closing of doors, heating and cooling. Also, one drive module 30 of the modular vehicle 1 may transmit electric power and/or electric signals via a functional module 40 and further to another drive module of the same vehicle 1, as illustrated by the connection 51 in FIG. 1. Thus, the connection 51 comprises e.g. at least one of a cable, bus or electrical line.

In some embodiments, the second control device 200 of the drive module 30 is configured to communicate with another drive module 30 being a part of the same assembled vehicle 1, as illustrated by dashed lines in FIG. 1.

In some embodiments, the second control device 200 of the drive module 30 is configured to communicate with a further control device e.g. a control device 300 of a functional module 40. A functional module 40 may thus comprise a control device, which is referred to as a third control device 300. The communication between the modules 30, 40 may be wireless or conductively or by wire. The wireless communication may be directly between the modules or via the off-board system (i.e. first control device 100). The modules 30, 40 of an assembled vehicle may communicate with each other and/or the first control device via 4G, 5G, V2V (Vehicle to Vehicle), Wi-Fi® or any other wireless communication means.

Considering an assembled vehicle 1 comprises two drive modules, the first control device 100 may appoint one drive module to be master drive module and the other to be slave drive module.

The proposed technique will now be explained with reference to the flow chart of FIG. 3. As previously described, this disclosure proposes, according to a first aspect, a method for operating the vehicle, for example operating the modular vehicle 1 in FIG. 1. The method may be implemented as a computer program comprising instructions which, when the program is executed by a computer (e.g. a processor in a first control device 100, second control device 200, or a third control device 300), cause the computer to carry out the method. According to some embodiments the computer program is stored in a computer-readable medium (e.g. a memory or a compact disc) that comprises instructions which, when executed by a computer, cause the computer to carry out the method. The proposed method is e.g. performed in a second control device 200 of a drive module 30 assigned to be a master drive module. However, it must be appreciated that the method may alternatively, at least partly, be implemented in the first control device 100 or in any one of the control devices 200, 300 of the modules of the vehicle, or the implementation may be distributed among several or all of the control devices 100, 200, 300.

The drive modules 30 of the vehicle are individually associated with an individual set of energy parameters. Thus, each drive module 30 is associated with an individual set of energy parameters. A set of energy parameters associated with a drive module 30 describes energy properties of the same drive module 30. For example, energy properties such as an optimized speed or speed interval of the drive module 30, one or several individual gear ratios for the drive module 30, or an amount of energy available to the drive module 30, for example State Of Charge (SOC). Hence, in some embodiments, the individual sets of energy parameters for the individual drive modules 30 indicate respective individual gear ratios of the drive modules 30. Also, in some embodiments, the individual set of energy parameters for respective individual drive module 30 comprises a parameter indicating an amount of energy available to the drive module 30. Reference is here made to the previous description of the propulsion system(s) of a drive module 30, see FIGS. 1 to 3. A drive module 30 may thus have only one propulsion system 91 with one gear device that specifies the gear ratio(s) of the drive module 30. Alternatively, the drive module 30 may thus have two propulsion systems 91, each with one individual gear device. The two gear devices of one drive module 30 together specify the available gear ratio(s) or the drive module 30. Thus, if one of the gear devices has only one gear ratio of 1:1, and the other has only two gear ratios of 1:1 and 1:2, the available gear ratios of the drive module 30 are 1:1 and 1:2.

A gear ratio is generally associated with a preferred speed or speed interval of the drive module 30, where the propulsion system 91 of the drive module 30 achieves the greatest efficiency. Also, the gear ratio may be associated with a preferred acceleration or acceleration interval, where the propulsion system 91 manage to accelerate most efficiently. Thus, a drive module 30 may be defined by the gear ratio(s) of its propulsion system(s) 91, to have an optimal efficiency for a certain speed or speed interval, and/or acceleration or acceleration interval. Thus, a drive module 30 may be suitable to be driven at a certain speed or in a certain speed interval. Also, a drive module 30 may be suitable to be accelerated with a certain acceleration or in a certain acceleration interval. In other words, in some embodiments, the individual gear ratios are individually associated with a certain speed or speed interval of the respective associated drive module 30. At least one drive module 30 of the vehicle has a gear ratio being different from any other gear ratio of any other drive module 30 of the drive modules 30 of the vehicle. Thus, one drive module 30 may be configured for driving in a low-speed interval, and one other of the drive modules 30 may be configured for driving in a high-speed interval, where the low-speed interval is different from the high-speed interval. The gear device(s) of each individual drive module 30 may thus have fixed but mutually different individual ratios. Thus, the drive modules 30 have different speed intervals in which they operate most efficiently. Also, in some embodiments, the individual gear ratios are individually associated with a certain acceleration or acceleration interval of the respective associated drive module 30.

Figure 4:
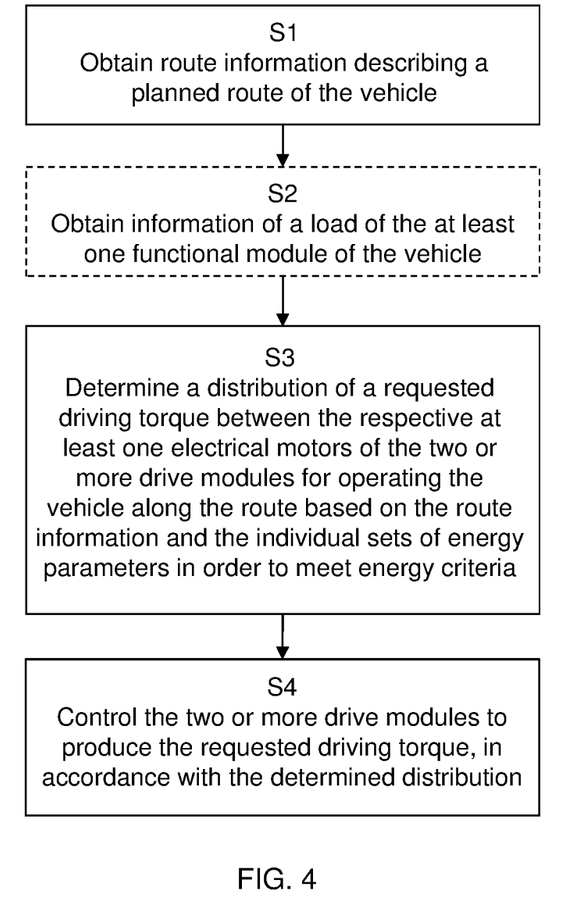
FIG. 4 illustrates a method for configuring operation of a vehicle according to the first aspect.

The method comprises obtaining S1 route information describing a planned route of the vehicle 1. The route information may be included in the received mission from the off-board system. The planned route may be divided into route segments. In some embodiments, the route information comprises topology information associated with route segments of the route.

The method also comprises determining S3 a distribution of a requested driving torque between the respective at least one electrical motors of the two or more drive modules 20 for operating the vehicle 1 along the route. The determining S3 is based on the route information and the individual sets of energy parameters, in order to meet energy criteria. The method utilizes the modularity of the vehicle to accomplish a kind of electrical gear. By having two drive modules 30 that may be optimized for e.g. different speed intervals or have different State Of Charge (SOC) levels, an efficient utilization of the vehicle may be achieved. Thus, for a planned route, the method optimizes the use of the drive modules 30, in order to meet energy criteria. The method may request most driving torque during a road segment from the drive module 30 that is determined to have the best properties (i.e. the best set of energy parameters) for the road segment, e.g. the best gearing for that road segment and/or the best SOC for that road segment. In determining the distribution, parameters of the set of energy parameters for one drive module 30 may be compared with parameters of the set of energy parameters for the other drive modules, of the two or more drive modules 30 in the vehicle 1. The best match for the road segment is then mainly used for propelling the vehicle 1 during that road segment 1. For example, a modular vehicle adapted for urban conditions, for example a city bus, may be driven at a very low average speed. A vehicle for such conditions may e.g. have drive modules 30 with a same fixed gear ratio, for example in the range 1:6-1:8, e.g. 1:7, relative to the electrical machine, that may be optimal for this kind of urban conditions. The method may then determine that the requested driving torque should be distributed equally between the drive module. This because they are both optimized for the same urban conditions. Thus, in some embodiments, several or all of the drive modules 30 of the two or more drive modules 30 are configured with gear ratio configured for urban conditions, i.e. low or very low speed restrictions. A gear ratio configured for urban conditions may correspond to associated speed of 10, 20, 30 or 40 km/h, or speed interval of 5-15, 10-30, 20-40 or 30-50 km/h. The gear ratio has a high efficiency for urban conditions, and the drive module 30 efficiently uses its resources. For example, it drives and accelerates efficiently and economically in urban conditions.

The requested driving torque to overcome the external forces acting on the vehicle (such as rolling resistance force to the wheels, gradient resistance force and aerodynamic drag resistance force) to achieve e.g. a certain speed or acceleration, is continuously determined e.g. calculated while travelling, or may be predicted in beforehand. To calculate the requested driving torque is known to the skilled person in the art and will not be described here in detail. However, the calculations are typically based on a model of the vehicle and models of external forces acting on the vehicle. A controller using the vehicle model and the external forces, calculates the driving torque (thus the requested driving torque) needed to overcome the external forces considering constraints such as maximum speed, maximum accelerations, to achieve e.g. a certain speed or acceleration. Thus, the method may include to also calculate the requested driving torque.

In another example, a modular vehicle adapted for extra-urban conditions, for example a coach, may be driven at a high average speed. A vehicle for such conditions may e.g. have drive modules 30 with a same fixed gear ratio, for example 1:0.8-1:2 relative to the electrical machine, that may be optimal for this kind of extra-urban conditions. The method may then determine that the requested driving torque should be distributed equally between the drive module. This because they are both optimized for the same extra-urban conditions. Thus, in some embodiments, several or all of the drive modules 30 of the two or more drive modules 30 is configured with gear ratio configured for extra-urban conditions, thus, 60 km/h or beyond. A gear ratio configured for extra-urban conditions, may correspond to an associated speed of 50, 60, 70, 80 or 90 km/h, or speed interval of 40-60, 50-70, 60-80, 70-90 or 80-100 km/h. The gear ratio has a high efficiency for extra-urban conditions, and the drive module 30 efficiently uses its resources. For example, it drives and accelerates efficiently and economically in extra-urban conditions.

However, some routes may have road segments with different speed requirements. For example, some road segments have very low speed restrictions, e.g. 10 km/h or below, and other road segments with much greater speed, e.g. 60 km/h or beyond. In this case, a vehicle having a drive module 30 configured for very low speed and one drive module 30 configured for greater speed may be used. Thus, in some embodiments, one of the drive modules 30 of the two or more drive modules 30 is configured with gear ratio configured for urban conditions, i.e. very low speed restrictions. Also, in some embodiments, one of the drive modules 30 of the two or more drive modules 30 is configured with gear ratio configured for extra-urban conditions, thus, 60 km/h or beyond. The method may then determine a distribution such that during road segments where the vehicle is driven at a very low speed, more, most or all of the requested driving torque is demanded from the drive module 30 configured for very low speed, and during road segments where the vehicle is driven at a greater speed, more, most or all of the requested driving torque is demanded from the drive module 30 configured for greater speed. Thereby, a high efficiency may be achieved for greater parts or all parts of the route. Also, thereby a high efficiency and a better propulsion ability may be maintained in a greater speed range.

In some embodiments, the rote information comprises topology information of the route. At least one of the drive modules 30 may have an individual gear ratio configured for the topology of at least one of the segments of the route. Thus, the method may then include to determine a distribution of the requested driving torque, such that that at least one drive module 30 mainly propels the vehicle 1 along this (or those) segment(s). In some embodiments, the two or more drive modules 30 have gear ratios that are individually configured for the topology of mutually different types of segments. In other words, one drive module has a gear ratio that is configured for one kind of topology, and another drive module has a gear ratio that is configured for another kind of topology. For example, if the route includes both flat and steep route segments, a drive module 30 with a gear ratio configured for steep route segments mainly propels the vehicle 1, and a drive module 30 with a gear ratio configured for flat route segments mainly propels the vehicle 1. For example, a gear ratio configured for steep hills, may include a gear ratio of 1:3 or 1:4. This may correspond to an associated speed of 10, 20, 30 or 40 km/h, or speed interval of 5-15, 10-30, 20-40 or 30-50 km/h. In another example, a gear ratio configured for flat road segments, thus cruising at the same speed, may have a gear ratio of 1:1 or 1:2. This may correspond to an associated speed of 50, 60, 70, 80 or 90 km/h, or speed interval of 40-60, 50-70, 60-80, 70-90 or 80-100 km/h.

If the vehicle 1 has no load or a very light load when driving in an uphill, the drive module 30 having most SOC may mainly propel the vehicle 1. Also, when braking, the most suitable drive module 30 may be used for braking the vehicle 1, considering the properties of the electric motor and gear ratio of the drive module 30.

In some embodiments the route information comprises speeds associated with route segments of the route. The route information may, as previously described, included in with the mission. The mission may thus include speeds associated with the route segments of the planned route. Alternatively, the vehicle may detect the speed noted on speed signs along the route and use the detected speed as route information. The determining S3 then comprises determining a distribution of a requested driving torque between the respective at least one electrical motors of the two or more drive modules 30 for operating the vehicle along the route. The determining is based on the route information and the individual sets of energy parameters in order to meet energy criteria including to maintain the speeds associated with route segments of the route. Thus, the method may include to adapt the determination of the distribution along the route, or before the mission is started, in order to maintain the speed while driving efficiently. Thus, for different route segments, the torque needed to propel the vehicle 1 to maintain a desired speed along the route segments, may be requested from different drive modules 30, or requested from the drive modules 30 with a varying amount, according to how well they are suited for the route segments. Thus, in some embodiments, the method comprises matching the speeds associated with route segments of the route, with the respective individual speed or speed interval associated with the individual gear ratios, in order to achieve the energy criteria to meet the speeds associated with the road segment. The determining S3 comprises determining a distribution of a requested driving torque where the requested driving torque is distributed to the at least one electrical motor of the drive module 30 that best matches the speed associated with a route segment, e.g. on which the vehicle is currently being driven. The controlling S4 thus comprises controlling the two or more drive modules 30 to produce the requested driving torque, in accordance with the determined distribution, during said route segment. Thus, the drive module 30 that is best optimized for the speed or speed interval of a route segment, is requested to give the largest amount of driving torque during that route segment.

The method further comprises controlling S4 the two or more drive modules 30 to produce the requested driving torque, in accordance with the determined distribution. Thus, the vehicle is being operated along the route with the determined distribution. The distribution may be determined in advance of execution of the transport mission, continually or continuously during execution of the transport mission.

In some embodiments, the method comprises obtaining S2 information of a load of the at least one functional module 40 of the vehicle. The determining S3 then comprises determining a distribution of a requested driving torque between the respective at least one electrical motors of the two or more drive modules 30 for operating the vehicle along the route, based on the route information, the individual sets of energy parameters and the load of the individual sets of energy parameters and the load of the vehicle, in order to meet energy criteria. Thus, if the vehicle carries a heavy load, the vehicle may determine a distribution of the requested driving torque that is optimal for startability, i.e. such that the vehicle can start rolling despite its heavy load. The requested driving torque may then be demanded from the drive module 30 that is optimized for startability, e.g. having a high gear ratio. For example, the gear ratio configured for startability may be 1:8-1:10. This corresponds to an associated speed of 10 km/h, or speed interval of 5-15 km/h. It may also corresponds to an acceleration that is efficient for reliable startability. Thus, in some embodiments, one of the drive modules 30 of the two or more drive modules 30 is configured with gear ratio configured for reliable startability. The fact that a vehicle is heavy, thus carries a heavy load, may be utilized when driving steep descents. The determined distribution may then be a negative distribution, that is, the method may determine to regenerate braking force. For example, a drive module 30 having a SOC that is relatively low (the lowest of the SOC of the drive modules 30 of the vehicle) may be selected to regenerate braking torque.

In some embodiments, each propulsion system 91 of the drive module 30 of FIG. 3, comprises an individual gear device 94 with at least one gear ratio being different from the gear ratios of the other gear devices 94 of the vehicle 1. Then, a virtual four-gear electric gearbox is obtained. During normal operation, only one wheel 37 in being driven. However, during road segments with harsh road conditions, that may be detected by the sensor arrangements or be previously known, the requested torque may be shared between the electrical motors 93 in in a way corresponding to a limited slip differential, LSD, or similar, to improve the traction, however with reduced energy efficiency.

The proposed technique is applicable on all sorts of road vehicles. However, the disclosure may relate to heavy vehicles, such as buses, trucks etc. Specifically, the present disclosure may relate to vehicles for use on public roads.

Figure 5:
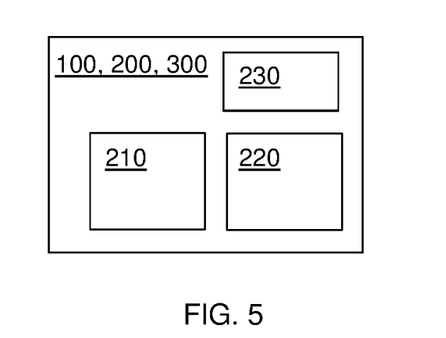
FIG. 5 illustrates an example implementation of a control device according to the second aspect.

According to the second aspect, the disclosure relates to a control device 100, 200, 300 for operating a vehicle, e.g. the vehicle 1 in FIG. 1. FIG. 5 illustrates an example implementation of such control device 100, 200, 300. The control device may be any of the control devices 200a, 200b, 300 of the vehicle 1 in FIG. 1, or a first control device 100 in an off-board system. In some embodiments, the control device 100, 200, 300 is a "unit" in a functional sense. Hence, in some embodiments the control device 100, 200, 300 is a control arrangement comprising several physical control units that operate in corporation. The control device 100, 200, 300 comprises hardware and software. The hardware basically comprises various electronic components on a Printed Circuit Board, PCB. The control device 100, 200, 300 comprises a processor 210, a memory 220 and one or more communication interfaces 230. The control device 100, 200, 300 or more specifically the processor 210 of the control device 100, 200, 300 is configured to cause the control device 100, 200, 300 to perform all aspects of the method described herein. This is typically done by running computer program code stored in the memory 220 in the processor 210 of the control device 100, 200, 300.

Some aspects of the control device 100, 200, 300 pertaining to the second aspect will now be described. More in detail, the control device 100, 200, 300 is configured to obtain route information describing a planned route of the vehicle 1. The control device 100, 200, 300 is typically configured to obtain the route information from the off-board system before the mission is started. The route information is for example sent as the same time as the mission, or in included in the same data block or message as the mission. In some embodiments, the control device 100, 200, 300 is configured for obtaining route information from sensors in the vehicle 1, such as a position sensor, a navigation system and other kinds of sensors sensing road conditions. Also, the control device 100, 200, 300 is may be configured to obtain route information from map data of the surroundings, including topology information, stored in a map database locally in the vehicle, in the cloud or in the off-board system. The control device 100, 200, 300 is also configured to determine a distribution of a requested driving torque between the respective at least one electrical motors of the two or more drive modules 30 for operating the vehicle 1 along the route based on the route information and the individual sets of energy parameters in order to meet energy criteria. Different examples of energy parameters have been previously described. The control device 100, 200, 300 is also configured to control the two or more drive modules 30 to produce the requested driving torque, in accordance with the determined distribution. For example, the control device is a second control device 200 in one of the drive modules that has been appointed by a first control device 100 to be a master that controls the other control devices 200, 300 in the vehicle 1.

According to some embodiments, the route information comprises speeds associated with route segments of the route, e.g. a maximum speed or an average speed for the route segment. The control device 100, 200, 300 is then configured to determine a distribution of a requested driving torque between the respective at least one electrical motors of the two or more drive modules 30 for operating the vehicle along the route, based on the route information and the individual sets of energy parameters in order to meet energy criteria including to maintain the speeds associated with route segments of the route. The control device 100, 200, 300 may be configured to obtain the speeds associated with route segments from sensors in the vehicle 1 arranged to sense speed restrictions on road signs. Alternatively, the control device 100, 200, 300 may be configured to obtain the speeds from the off-board system including predetermined speeds e.g. determined based on what load the vehicle carries. The speeds may also be predetermined from the haulage firm.

According to some embodiments, the control device 100, 200, 300 is configured to match the speeds associated with route segments of the route, with the respective individual speed or speed interval associated with the individual gear ratios, in order to achieve the energy criteria to meet the speeds associated with the route segments. The control device 100, 200, 300 is then configured to determine a distribution of a requested driving torque where the requested driving torque is distributed to the at least one electrical motor of the drive module 30 that best matches the speed associated with a route segment, e.g. on which the vehicle is currently being driven. The control device 100, 200, 300 is also configured to control the two or more drive modules 30 to produce the requested driving torque, in accordance with the determined distribution, during the route segment. Thus, the control device 100, 200, 300 is configured to demand the requested torque from the electrical machines according to an energy efficient distribution along the route, such that the most suitable drive module 30 (considering speed) for a road segment is used for propelling the vehicle 1 during that road segment.

According to some embodiments, the control device 100, 200, 300 is configured to obtain information of a load of the at least one functional module 40 of the vehicle 1. The control device 100, 200, 300 is also configured to determine a distribution of a requested driving torque between the respective at least one electrical motors of the two or more drive modules 30 for operating the vehicle along the route, based on the route information, the individual sets of energy parameters and the load of the vehicle, in order to meet energy criteria. Thus, the control device 100, 200, 300 is configured to demand the requested torque from the electrical machines according to an energy efficient distribution along the route, such that the most suitable drive module 30 (considering load) for a road segment is mainly used for propelling the vehicle 1 during that road segment.

The above described embodiments may of course be combined to meet different energy efficiency criteria, e.g. considering both speed and load.

The disclosure also relates to a third aspect, namely a vehicle, e.g. the vehicle 1 of FIG. 1, comprising a control device 200, 300 according to the second aspect. The control device may be a second control device 200 or a third control device 300. The vehicle according to the third aspect also comprises at least one functional module 40 and two or more drive modules 30. The drive modules 30 are configured to be autonomously operated and are individually associated with an individual set of energy parameters. At least one drive module 30 has a gear ratio being different from any other gear ratio of any other drive module 30. Each drive module 30 respectively comprises a pair of wheels 37, at least one electrical motor arranged for operating the pair of wheels 37, and at least one interface 50 releasably connected to a corresponding interface 50 on the functional module 40.

The route information may include one or several locations (for example indicating a specific area or road segment, or a position e.g. a coordinate), and/or road curve radius and/or topography information but may also include road surface data, and geographical data or even weather data.

The control device 100, 200, 300 also comprises one or more communication interfaces 230, enabling the control device 200 to communicate with other modules 30, 40 of the modular vehicle 1, or of other vehicles. The communication between the modules is as mentioned above wireless, conductive or wired. Wired communication may be implemented standard protocols such as Controller Area Network, CAN. CAN is a robust vehicle bus standard designed to allow microcontrollers and devices to communicate with each other in applications without a host computer. Wireless communication between the modules may be implemented using any short-range communication protocol such as Bluetooth® or IEEE 802.11.

In some embodiments, the control device 100, 200, 300 is configured to receive sensor data, by means of the communication interface 230. The sensor data may be collected by the sensor arrangement 250a in the first drive module 30a, the sensor arrangement 250b in the second drive module 30a and/or the sensor arrangement 250c in the at least one functional module 40. The sensor data is provided from the sensor arrangements 250a, 250b, 250c to the control device 100, 200, 300 via wire or wirelessly. The sensor data from the sensor arrangement 250c may first be provided to the control device 300 in the functional module 40, and therefrom communicated to the control device 200 in a drive module 30 or to the control device 100 in the off-board system. The sensor data from the sensor arrangement 250a, 250b in a drive module 30 may first be provided to the control device 200 in the same functional module 40, and therefrom communicated to the master control device 200 or to the first control device 100.

The one or more communication interfaces 230 is thus also configured to enable wireless communication between a control device 200, 300 in a vehicle 1 and a first control device 100 in the off-board system. The wireless communication is e.g. implemented using 4G, 5G, V2V (Vehicle to Vehicle) or any other suitable wireless communication protocol.

The terminology used in the description of the embodiments as illustrated in the accompanying drawings is not intended to be limiting of the described method; control arrangement or computer program. Various changes, substitutions and/or alterations may be made, without departing from invention embodiments as defined by the appended claims.

The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims.

The invention claimed is:

1. A method performed by a control device of a vehicle, for operating the vehicle, wherein the vehicle comprises: at least one functional module; and two or more drive modules, wherein each of the drive modules is a separate unit from the at least one functional module, can be connected and disconnected from the at least one functional module, is configured to be autonomously operated, is individually associated with an individual set of energy parameters, comprises: a pair of wheels; at least one electrical motor arranged for operating the pair of wheels; and at least one interface releasably connected to a corresponding interface on the functional module, and is independently connectable to and disconnectable from the functional module, and wherein at least one drive module has a gear ratio being different from any other gear ratio of any other drive module and where a gear ratio for each of the two more drive modules is used in defining the individual set of energy parameters for the drive module;

the method comprising:

receiving the individual set of energy parameters for each of the two or more drive modules;

obtaining route information describing a planned route of the vehicle;

determining a distribution of a requested driving torque between the respective at least one electrical motor of the two or more drive modules for operating the vehicle along the route based on the route information and the individual sets of energy parameters for each of the two or more drive modules in order to meet energy criteria; and controlling the two or more drive modules to produce the requested driving torque, in accordance with the determined distribution.

2. The method according to claim 1, wherein the individual gear ratios are individually associated with a certain speed or speed interval of the respective associated drive module.

3. The method according to claim 2, wherein the route information comprises speeds associated with route segments of the route, wherein determining a distribution of a requested driving torque comprises:

determining a distribution of a requested driving torque between the respective at least one electrical motors of the two or more drive modules for operating the vehicle along the route, based on the route information and the individual sets of energy parameters in order to meet energy criteria including to maintain the speeds associated with route segments of the route.

4. The method according to claim 3, wherein determining a distribution of a requested driving torque comprises:

matching speeds associated with route segments of the route, with the respective individual speed or speed interval associated with the individual gear ratios, in order to achieve the energy criteria to meet the speeds associated with the route segments; and determining a distribution of a requested driving torque where the requested driving torque is distributed to the at least one electrical motor of the drive module that best matches the speed associated with a route segment, and wherein the controlling the two or more drive modules comprises controlling the two or more drive modules to produce the requested driving torque, in accordance with the determined distribution, during said route segment.

5. The method according to claim 1, wherein one of the drive modules of the two or more drive modules is configured with a gear ratio configured for startability.

6. The method according to claim 1, wherein one of the drive modules of the two or more drive modules is configured with a gear ratio configured for extra-urban conditions.

7. The method according to claim 1, wherein one of the drive modules of the two or more drive modules is configured with a gear ratio configured for urban conditions.

8. The method according to claim 1, wherein the route information comprises topology information associated with route segments of the route, and wherein at least one of the drive modules has an individual gear ratio configured for the topology of at least one of the segments.

9. The method according to claim 8, wherein the two or more drive modules have gear ratios that are individually configured for the topology of mutually different types of segments.

10. The method according to claim 1, comprising:
obtaining information of a load of the at least one functional module of the vehicle; and
wherein the determining a distribution of a requested driving torque comprises:
determining a distribution of a requested driving torque between the respective at least one electrical motor of the two or more drive modules for operating the vehicle along the route, based on the route information, the individual sets of energy parameters and the load of the individual sets of energy parameters and the load of the vehicle, in order to meet energy criteria.

11. The method according to claim 1, wherein the individual set of energy parameters for respective individual drive module comprises a parameter indicating an amount of energy available to the drive module.

12. The method according to claim 1, wherein each drive module comprises an individual propulsion system configured to operate an individual wheel of the drive module, where each individual propulsion system comprises an individual gear device with at least one gear ratio being different from gear ratios of other gear devices of the other individual propulsion systems associated with the other wheels of the two more drive modules, and wherein said controlling the two or more drive modules to produce the requested driving torque comprises controlling the two or more drive modules in a manner corresponding to a limited slip differential to improve traction of the individual wheels.

13. A computer program product comprising computer program code stored on a non-transitory computer-readable medium, said computer program product used for operating a vehicle that comprises: at least one functional module; and two or more drive modules, wherein each of the drive modules is a separate unit from the at least one functional module, can be connected and disconnected from the at least one functional module, is configured to be autonomously operated, is individually associated with an individual set of energy parameters, comprises: a pair of wheels; at least one electrical motor arranged for operating the pair of wheels; and at least one interface releasably connected to a corresponding interface on the functional module, and is independently connectable to and disconnectable from the functional module, and wherein at least one drive module has a gear ratio being different from any other gear ratio of any other drive module and where a gear ratio for each of the two more drive modules is used in defining the individual set of energy parameters for the drive module, said computer program code comprising computer instructions to cause one or more control devices to perform the following operations:
receiving the individual set of energy parameters for each of the two or more drive modules;
obtaining route information describing a planned route of the vehicle;
determining a distribution of a requested driving torque between the respective at least one electrical motor of the two or more drive modules for operating the vehicle along the route based on the route information and the individual sets of energy parameters for each of the two or more drive modules in order to meet energy criteria; and
controlling the two or more drive modules to produce the requested driving torque, in accordance with the determined distribution.

14. A control device for operating an autonomous vehicle, wherein the autonomous vehicle comprises: at least one functional module; and two or more drive modules, wherein each of the drive modules is a separate unit from the at least one functional module, can be connected and disconnected from the at least one functional module, is configured to be autonomously operated, is individually associated with an individual set of energy parameters, comprises: a pair of wheels; at least one electrical motor arranged for operating the pair of wheels; and at least one interface releasably connected to a corresponding interface on the functional module, and is independently connectable to and disconnectable from the functional module, and wherein at least one drive module has a gear ratio being different from any other gear ratio of any other drive module and where a gear ratio for each of the two more drive modules is used in defining the individual set of energy parameters for the drive module; wherein the control device is configured to:
receive the individual set of energy parameters for each of the two or more drive modules;
obtain route information describing a planned route of the vehicle;
determine a distribution of a requested driving torque between the respective at least one electrical motors of the two or more drive modules for operating the vehicle along the route based on the route information and the individual sets of energy parameters for each of the two or more drive modules in order to meet energy criteria; and
control the two or more drive modules to produce the requested driving torque, in accordance with the determined distribution.

15. The control device according to claim 14, wherein the individual gear ratios are individually associated with a certain speed or speed interval of the respective associated drive module.

16. The control device according to claim 15, wherein the route information comprises speeds associated with route segments of the route, wherein the control device is configured to:

determine a distribution of a requested driving torque between the respective at least one electrical motor of the two or more drive modules for operating the vehicle a long the route, based on the route information and the individual sets of energy parameters in order to meet energy criteria including to maintain the speeds associated with route segments of the route.

17. The control device according to claim 16, wherein the control device is configured to:
match the speeds associated with route segments of the route, with the respective individual speed or speed interval associated with the individual gear ratios, in order to achieve the energy criteria to meet the speeds associated with the route segments;
determine a distribution of a requested driving torque where the requested driving torque is distributed to the at least one electrical motor of the drive module that best matches the speed associated with a route segment; and
control the two or more drive modules to produce the requested driving torque, in accordance with the determined distribution, during said route segment.

18. The control device according to claim 14, wherein one of the drive modules of the two or more drive modules is configured with a gear ratio configured for startability.

19. The control device according to claim 14, wherein one of the drive modules of the two or more drive modules is configured with a gear ratio configured for extra-urban conditions.

20. The control device according to claim 14, wherein one of the drive modules of the two or more drive modules is configured with a gear ratio configured for urban conditions.

21. The control device according any to claim 14, wherein the route information comprises topology information associated with route segments of the route, and wherein at least one of the drive modules has an individual gear ratio configured for the topology of at least one of the segments.

22. The control device according to claim 21, wherein the two or more drive modules have gear ratios that are individually configured for the topology of mutually different types of segments.

23. The control device according to claim 14, wherein the control device is configured to:
obtain information of a load of the at least one functional module of the vehicle; and
determine a distribution of a requested driving torque between the respective at least one electrical motors of the two or more drive modules for operating the vehicle along the route, based on the route information, the individual sets of energy parameters and the load of the vehicle, in order to meet energy criteria.

24. The control device according to claim 14, wherein the individual set of energy parameters for respective individual drive module comprises a parameter indicating an amount of energy available to the drive module.

25. A vehicle comprising:
at least one functional module;
two or more drive modules, wherein each of the drive modules is a separate unit from the at least one functional module, can be connected and disconnected from the at least one functional module, is configured to be autonomously operated, is individually associated with an individual set of energy parameters, comprises: a pair of wheels; at least one electrical motor arranged for operating the pair of wheels; and at least one interface releasably connected to a corresponding interface on the functional module, and is independently connectable to and disconnectable from the functional module, and wherein at least one drive module has a gear ratio being different from any other gear ratio of any other drive module and where a gear ratio for each of the two more drive modules is used in defining the individual set of energy parameters for the drive module; and
a control device configured to:
receive the individual set of energy parameters for each of the two or more drive modules;
obtain route information describing a planned route of the vehicle;
determine a distribution of a requested driving torque between the respective at least one electrical motors of the two or more drive modules for operating the vehicle along the route based on the route information and the individual sets of energy parameters for each of the two or more drive modules in order to meet energy criteria; and
control the two or more drive modules to produce the requested driving torque, in accordance with the determined distribution.

* * * * *